Patented Mar. 31, 1936

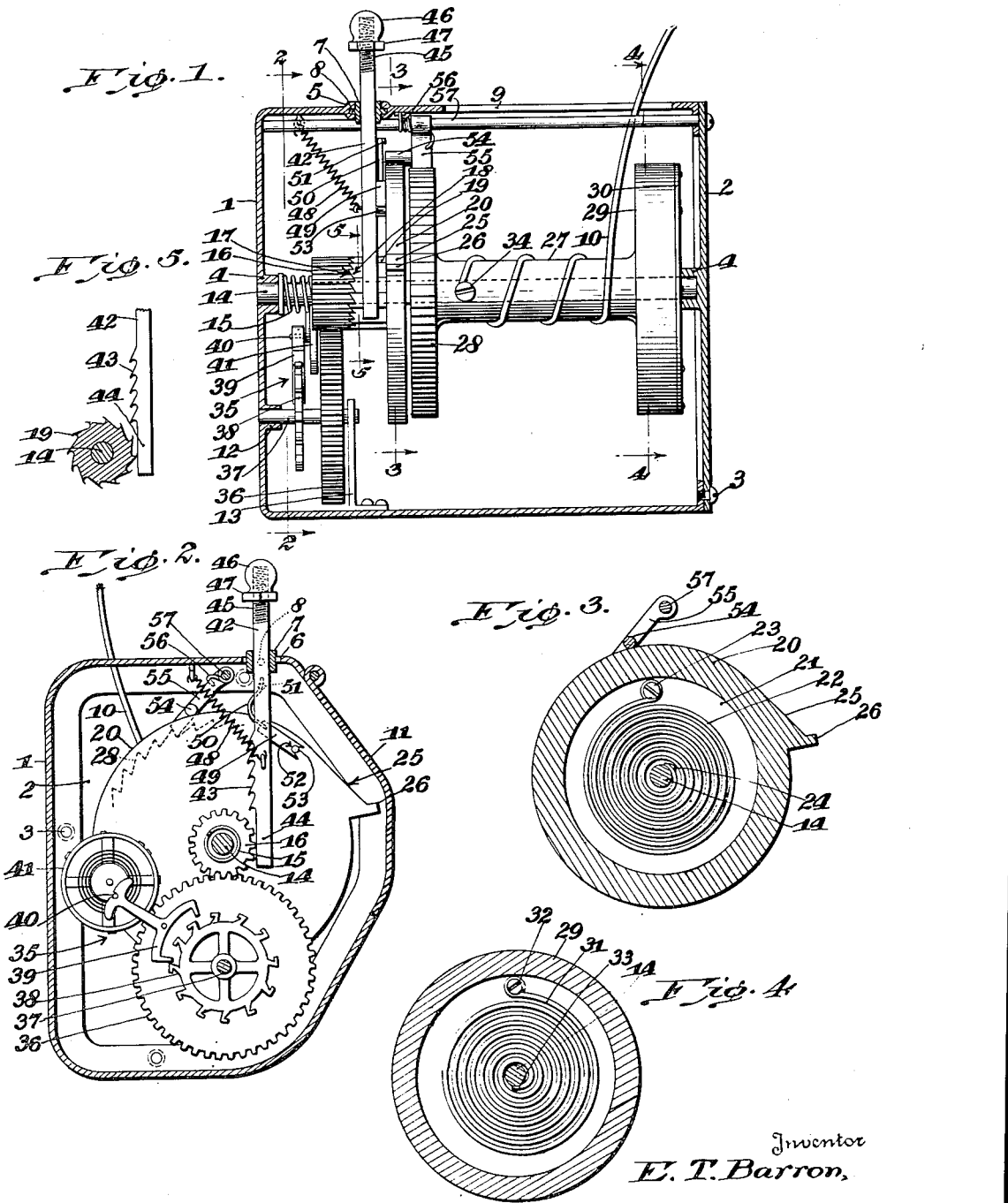

2,035,779

UNITED STATES PATENT OFFICE 2,035,779

AUTOMATIC RIP CORD TIMER

Edward T. Barron, Minneapolis, Minn.

Application November 12, 1934, Serial No. 752,782

5 Claims. (Cl. 161—1)

This invention relates to improvements in parachutes, more specifically in time controlling mechanism by which the event of releasing the parachute is governed, and its objects are as follows:—

First, to provide a timer which is capable of being quickly set without the necessity of looking at the timer in order to scrutinize a setting device of some sort, said timer, therefore, being capable of being set in the dark, for the purpose of causing the release of a parachute from its container at a given time within the operating time-range of the device, and regardless of whether or not the person suspended by the parachute remains conscious.

Second, to provide a timer which is capable of being set almost as quickly as the attendant on the aircraft can move from one passenger to the next, the setting being accomplished by simply operating the plunger a given number of times in order to determine the moment when the rip cord shall be pulled automatically, thereby relieving the wearer of the parachute of the responsibility of pulling the rip cord, which he might fail to do in time due to fear or excitement, or the loss of consciousness.

Third, to provide a timer which is not necessarily set for automatic operation at a determined period, but in which the foregoing plunger can be held down until pressure is either voluntarily or involuntarily released, whereupon an automatic pulling of the rip cord would ensue.

Fourth, to provide a timer in which the chance of making a mistake in setting is reduced to a point of its being negligible, the only requirement being a depression and release of the plunger one or more times, thereby initiating as many time-periods representative of the depressions at the end of which an automatic release of the parachute will occur.

Fifth, to provide a timer which is inherently simple both in construction and operation because of the reduction of the working parts to quite a small number.

Other objects and advantages will appear in the following specification, reference being had to the accompanying drawing in which, Figure 1 is a longitudinal section of the timer case, the internal mechanism being shown in elevation.

Figure 2 is a cross section taken on the line 2—2 of Figure 1, all of the parts shown being in the initial position prior to setting the timer for an automatic release.

Figure 3 is a cross section taken on the line 3—3 of Figure 1, particularly illustrating the cam disc and its actuating springs.

Figure 4 is a cross section taken on the line 4—4 of Figure 1, illustrating the interior of one of the winch heads and the spring for turning the winch in order to wind up the rip cord.

Figure 5 is a detail section taken on the line 5—5 of Figure 1 especially illustrating the rack end of the plunger and the gear wheel operated thereby.

As has been indicated already, the purpose of the device is to pull the rip cord for parachute jumpers. The prevailing practice is for the jumper to count up to a certain number before pulling his rip cord after leaving an aircraft in flight, thereby to make sure that he has safely cleared the aircraft before releasing the parachute from its container and so avoid the possibility of its becoming entangled. There have been accounts of persons pulling the rip cord prematurely with the result last named, and there have also been accounts of persons failing to pull the rip cord either in time for a safe opening, or none at all as in the case of the loss of consciousness. When the timer is once set and then left alone it will function of its own accord to pull the rip cord at the end of the time-period for which the setting is made.

In carrying out the invention provision is made of a case 1 which can be of any suitable material and of any desired pattern. The mode by which it is adapted to be carried by the jumper is not material to the invention, the only requirement being that it shall be so related to the rip cord that upon the rip cord being wound up within the case the resulting pull will undo the container (not shown) and release the parachute (also not shown). A plate 2 closes the open end of the case through which the internal mechanism is inserted in the original assemblage.

Means 3 permanently secure the plate to the case. The case and plate have confronting bosses 4. A formation 5 in the top of the case (Fig. 1) which includes a laterally enlarged hole 6 (Fig. 2), provides a mounting for a bearing 7 which is capable of limited rocking because of its pintles 8. There is an opening 9 in the top for the rip cord 10. A small hinged door 11 (Fig. 2) permits access to the interior of the case for resetting a stop arm later described. A boss 12 on the case 1 and a standard 13 (or its equivalent) provide bearings.

A shaft 14 runs practically from end to end of the case 1, and is fixed in the bosses 4 so that it will not turn. One of these bosses is the abutment for the pressure of a spring 15, the inner end of which presses against a combined pinion 16 and ratchet 17. The ratchet teeth are held in engagement with corresponding teeth 18 on the confronting side of a gear wheel 19. The pinion 16 and gear wheel 19 are loose on the shaft 14. The confronting ratchet teeth 17, 18 are held in mesh by the spring 15, and it is only when the gear wheel 19 is turned clockwise as in a setting operation, that the teeth 18 drag over the teeth 17.

It is to be observed that the teeth of the gear wheel 19 are of a form different (Fig. 5) from the teeth of the pinion 16 (Fig. 2). The latter are spur teeth while the former are more in the nature of ratchet teeth.

The gear wheel 19 is positively turned in the clockwise direction only, this being in the setting operation and by manual effort. This gear wheel turns counter-clockwise by spring action. The pinion 16 is intended to turn in the counter-clockwise direction only, under the same spring action and by reason of the intermeshing teeth 17, 18.

A cam disc 20 is secured to the gear wheel 19 so that the two turn on the shaft 14 as a unit. The cam disc has a hollow interior 21 (Fig. 3). This forms a chamber to contain a coil spring 22. This spring is wound upon the clockwise turn of the gear wheel 19, and its unwinding furnishes the power for the counter-clockwise turn of the gear wheel 19 and pinion 16. One end of the spring is attached at 23 to the cam disc. The other end is attached at 24 to the shaft 14. A cam 25 (which gives the disc its name) consists of an enlarged place on its otherwise circular periphery. This cam terminates in a lug 26 which is instrumental in stopping the counter-clockwise turn of the cam disc by action of the spring 22.

A winch 27 is free to rotate on the shaft 14. It has two heads, one a ratchet 28, the other one 29 a hollow head. The latter has a closure plate 30 (Fig. 1) by which a coil spring 31 (Fig. 4) is concealed. One end of this spring is attached at 32 to the hollow head, the other end being attached at 33 to the shaft 14. One end of the rip cord 10 is attached to the winch 27 as at 34. The rip cord 10 is intended to be pulled out of the opening 9 as part of the original act of the passenger emplacing the parachute container upon his person.

Pulling out the rip cord unwinds it from the winch 27, the consequent counter-clockwise rotation winding up the spring 31 (Fig. 4) and storing tension therein for the final operation of rewinding the rip cord, or in other words for the pulling of the rip cord, in order to release the parachute.

Escapement mechanism 35 governs the rate of unwinding of the coil spring 22 (Fig. 3). This mechanism comprises a gear 36 in constant mesh with the pinion 16. This gear is carried by a shaft 37 which rotates in the boss 12 and standard 13. It carries an escapement wheel 38. This wheel cooperates with a pallet 39. This pallet is pivoted to the case 1 in any desired way. It is actuated by the roller pin 40 of a balance wheel 41.

At this point it is desired to state that the escapement mechanism 35 is not intended to be confined to the elements shown and just described. This illustration is provided because of its similarity to the ordinary escapement mechanism of a clock. In practice it can be substituted by any simple form of fan or weight governor, the specific type of governor being immaterial as long as it performs the function of an escapement mechanism capable of retarding the unwinding of the spring 22.

A plunger 42 is slidably carried by the bearing 7. The plunger is in line with the gear wheel 19 and has a rack end 43 to mesh with the teeth thereof. The rack 43 stops short of the smooth terminal 44 of the plunger, and when the smooth end engages the gear teeth there is no appreciable impediment to the counter-clockwise turning of the gear wheel by unwinding of the spring 22 (Fig. 3). The plunger is capable of being swung out of its perpendicular position so as to disengage the gear and rack teeth, the rocking function of the bearing 7 being for this purpose. The threaded end 45 carries a button 46 and a jam nut 47. The button can be screwed in either direction on the threads 45 and then locked by means of the nut 47, thereby adjusting the length of the stroke of the plunger, the stroke being limited by the engagement of the jam nut with the bearing 7.

A spring 48 is attached at its ends to the case 1 and to the plunger 42 for the purpose of tending to keep the plunger against the gear wheel 19. This insures the meshing of the rack end 43 with the teeth of the gear wheel when the plunger is depressed. A stop arm 49 is carried by the free end of a leaf spring 50. The spring is secured at 51 to the plunger 42. The free end of the stop arm has a crotch 52. The tendency of the spring 50 is to hold the stop arm 49 parallel to the plunger, and when the stop arm assumes the parallel position it is inoperative insofar as its stopping function is concerned. The door 11 is opened in order to gain access to the stop arm for the purpose of setting.

When set the crotch of the stop arm 49 receives a pin 53 on one side of the cam disc 20. The leaf spring 50 then assumes the bowed position (Fig. 2), the resistance of the bowed spring being sufficient to overcome any tendency of the coil spring 22 (Fig. 3) to unwind in the counter-clockwise direction.

The lug 54 of a dog 55, constituting detent means, rides the periphery of the cam disc 20, being held there by a spring 56. The dog is turnably carried by a slender rod 57 (or its equivalent), mounted in the case 1, the dog engaging the ratchet 28 by force of the spring 56 (or by gravity if preferred) to prevent the clockwise unwinding of the spring 31 (Fig. 4) and the consequent winding up of the rip cord 10 upon the winch 27 until a release of the dog occurs by operation of the cam 25 against the lug 54.

The operation is readily understood. When attaching the parachute to the person intending to use it, the rip cord 10 is pulled out of the case nearly all the way. This act turns the winch 27 in the counter-clockwise direction (Fig. 4), thereby unwinding the cord and winding the spring 31. The ratchet 28 moves under the dog 55; later the dog holds the winch in the set position. The stop arm 49 is then placed against the pin 53 so as to hold the cam disc 20 in the stopped position, whereupon the rip cord is threaded in the proper way to hold the parachute in its container. The cam disc spring 22 (Fig. 3) is always under tension. The amount of this tension does not vary a great deal, and the spring never unwinds fully, being prevented from doing so by the engagement of the lugs 26, 54 at the end of a releasing operation.

Preparatory to making the jump, either the person wearing the parachute or the attendant on the aircraft will depress the plunger 42 that number of times corresponding with the number of seconds which are desired to elapse before the parachute is released. To illustrate: A depression of the plunger 42 will give the gear wheel 19 a fractional turn in the clockwise direction (Fig. 5). The cam 25 and lug 26 will be advanced a little farther in the clockwise direction (Fig. 2). The time required for the cam 25 to reach the lug 54 will be, let us say five seconds. Every depression of the plunger 42 will advance the cam 25 and lug 26 farther in the clockwise direction so that the time-period for the shifting of the lug 54 is lengthened. The manner of determination of the time-period is a matter of selection and adjustment because it can be regulated by the initial positioning of the cam 25 with reference to the lug 54 as well as by adjusting the stroke of the plunger 42.

Consider a depression of the plunger 42. The cam disc 20 is turned in the clockwise direction by the engagement of the rack 43 with the gear wheel 19. The latter will turn in reference to the pinion 16, and when the teeth 18 slip over the teeth 17 the spring 15 will yield upon the lateral displacement of the pinion 16 on the shaft 14. The spring 22 was initially placed under tension as described. The depression of the plunger increases the tension just a little. The clockwise turn of the disc disengages the pin 53 from the stop arm 49 so that the arm assumes an inoperative position parallel to the plunger.

Upon release of the plunger 42 the cam disc 20 is free to turn in the counter-clockwise direction (Fig. 3) by force of the spring 22. The escapement mechanism 35 governs the counter-clockwise turn. At the end of the determined time-period the cam 25 will ride under the lug 54 and raise the dog 55 from the ratchet 28. The lug 26 abuts the lug 54 so that there will not be a needless unwinding of the spring 22 and consequent counter-clockwise turning of the cam disc 20.

Upon release of the ratchet 28 the winch 27 is free to rotate clockwise (Fig. 4) by force of the spring 31. This winds up the rip cord 10 and causes the release of the parachute from its container. It was stated that the plunger 42 could be depressed a number of times in order to increase the time-period at the end of which the parachute release would occur. An alternate mode of operation is to hold the plunger 42 depressed in making the jump, the jumper releasing the plunger when he finds that he has safely cleared the aircraft.

In any event it is the release of the plunger 42 following a depression thereof which starts the operation of the timer, the time range being determined according to either of the two modes set out, first one or more depressions of the plunger and a final release thereof, second a sustained depression of the plunger and final release thereof.

I claim:—

1. In a rip cord timer, detent means to be displaced from a detaining position, a cam disc having a cam which is movable toward the detent means for its displacement, a pin which is fixed on the disc hence goes with the cam, a stop arm in blocking engagement with the pin to prevent movement of the disc and cam, a plunger by which the stop arm is carried, a depression of the plunger releasing the stop arm from the pin so as to free the disc and cam, and a spring which is active upon the disc to move its cam toward and under the detent means after the relief of depression of the plunger.

2. In a rip cord timer, detent means to be displaced from a detaining position, a cam disc having a cam which is movable toward the detent means for its displacement, a pin which is fixed on the disc hence goes with the cam, a stop arm in blocking engagement with the pin to prevent movement of the disc and cam, a plunger by which the stop arm is carried, a depression of the plunger releasing the stop arm from the pin so as to free the disc and cam, a spring which is active upon the disc to move its cam toward and under the detent means after the relief of depression of the plunger, and lugs respectively on the detent means and cam disc, coming into engagement when displacement is accomplished so as to keep the cam from going farther.

3. In a rip cord timer, detent means which is displaceable from a detaining position, a disc having a cam, a spring tending to turn the disc and move the cam toward the detent means for its displacement, a pin on the disc, a stop arm having a crotch in which the pin is rested, a plunger and means operable by a depression of the plunger to turn the disc counter to the spring and displace the pin from the crotch, and a leaf spring by which the stop arm is attached to the plunger, said spring assuming a bowed position when said arm holds the pin but straightening beside the plunger upon said displacement of the pin.

4. In a rip cord timer, a case, detent means within the case assuming a detaining position, a cam disc to displace the detent means, said disc having a gear wheel, a spring tending to turn the disc so that the cam will release the detent means, a stop device to initially prevent turning of the disc, a plunger by which the stop device is carried, said plunger having a rack operable on the gear wheel during one direction of movement only during which the stop device is released, and a rocking bearing for the plunger, being rockably carried by the case to enable the plunger to swing away from the gear wheel in its idle movement.

5. In a rip cord timer, a spring-actuated winch having a rip cord attached thereto, detent means to be displaced from a detaining position with respect to said winch, said detent means including a lug, a cam disc having a cam which is movable toward the detent means for its displacement, a pin which is fixed on the disc hence goes with the cam, a stop arm in blocking engagement with the pin to prevent movement of the disc and cam, a plunger by which the stop arm is carried, a depression of the plunger releasing the stop arm from the pin so as to free the disc and cam, a spring which is active upon the disc to move its cam toward and under the lug of the detent means after the relief of depression of the plunger to release the spring-actuated winch for winding the rip cord, and a lug on the cam disc coming into engagement with the detent lug when displacement is accomplished so as to keep the cam from going farther.

EDWARD T. BARRON.